(12) United States Patent
Lin et al.

(10) Patent No.: US 8,086,793 B2
(45) Date of Patent: Dec. 27, 2011

(54) OPTICAL DISC RECORDER AND BUFFER MANAGEMENT METHOD THEREOF

(75) Inventors: Tai-Liang Lin, Keelung (TW); Shih-Ta Hung, Taoyuan County (TW)

(73) Assignee: Mediatek Inc., Hsin-Chu (TW)

( * ) Notice: Subject to any disclaimer, the term of this patent is extended or adjusted under 35 U.S.C. 154(b) by 843 days.

(21) Appl. No.: 12/024,130

(22) Filed: Feb. 1, 2008

(65) Prior Publication Data
US 2008/0215829 A1    Sep. 4, 2008

Related U.S. Application Data

(60) Provisional application No. 60/890,206, filed on Feb. 16, 2007.

(51) Int. Cl.
*G06F 12/00* (2006.01)
(52) U.S. Cl. .......... 711/113; 711/155; 711/E12.001
(58) Field of Classification Search .......... 711/113, 711/155, E12.001
See application file for complete search history.

(56) References Cited

U.S. PATENT DOCUMENTS

| | | | |
|---|---|---|---|
| 5,636,355 A * | 6/1997 | Ramakrishnan et al. | 711/113 |
| 6,907,499 B2 | 6/2005 | Herbst et al. | |
| 2007/0109940 A1 * | 5/2007 | Ando et al. | 369/59.25 |

FOREIGN PATENT DOCUMENTS

| | | |
|---|---|---|
| JP | 2000222137 | 8/2000 |
| TW | 200638349 | 11/2006 |
| TW | 200638413 | 11/2006 |

OTHER PUBLICATIONS

English language translation of abstract of JP 2000222137 (published Aug. 11, 2000).
English language translation of abstract of TW 200638349 (published Nov. 1, 2006).
English language translation of abstract of TW 200638413 (published Nov. 1, 2006).

* cited by examiner

*Primary Examiner* — Matt Kim
*Assistant Examiner* — John P Fishburn
(74) *Attorney, Agent, or Firm* — Thomas|Kayden

(57) ABSTRACT

A buffer management method is provided. A host issues a read command requesting access for a read data block and a write command requesting recording of a write data block. A write buffer is dedicated to store the write data block. A read buffer is dedicated to store the read data block. The method comprises entering the optical disc recorder into a write loop. During the write loop, the optical disc recorder triggering a write command handling procedure in response to the write command; triggering a read command handling procedure in response to the read command; and triggering a pre-recording procedure to prepare the write data block in the write buffer for recording. Wherein contents between the write buffer and read buffer are exchangeable during the write handling procedure, the read handling procedure or the pre-recording procedure.

11 Claims, 6 Drawing Sheets

OPTICAL DISC RECORDER AND BUFFER MANAGEMENT METHOD THEREOF

BACKGROUND OF THE INVENTION

1. Field of the Invention

The invention relates to optical disc drives, and in particular, to a buffer management method for an optical disc recorder.

2. Description of the Related Art

FIG. 1 shows a conventional structure of an optical disc recorder 100. A drive control unit 106 controls a buffer 104 and performs physical access of an optical disc 108. The drive control unit 106, in response to a read commands #R issued by a host 102, accesses read data blocks $\#D_R$ from the optical disc 108 and stores the assessed read data blocks $\#D_R$ to the buffer 104. And then the drive control unit 106 transfers the read data blocks $\#D_R$ to the host 102. In addition, the drive control unit 106, in response to a write command #W issued by the host 102, receives write data blocks $\#D_W$ transferred from host 102 and stores it to the buffer 104. And then the drive control unit 106 records the write data blocks $\#D_W$ to the optical disc 108.

The write data block $\#D_W$ instructed to be recorded into the optical disc 108 may not be instantly sent to the drive control unit 106 for recording, but buffered in the buffer 104 until a specific condition (i.e. start recording condition) is met. For example, a plurality of essential data blocks may be collected from the write data block $\#D_W$ to form an ECC block as a basic unit for physical recording. The ECC block may be sent to the drive control unit 106 and be recorded onto the optical disc 108 upon completed corresponding data blocks collection. In another exemplary embodiment, when a memory size of the stored write data blocks $\#D_W$ is greater than a threshold, the write data blocks $\#D_W$ collected in an ECC unit are sent to the drive control unit 106 and recorded onto the optical disc 108. Thereafter, a buffer area for storing corresponding write data block $\#D_W$ or the read data block $\#D_R$ may be erased or released from the buffer 104. The buffer 104 retains in a write loop as long as any write data block $\#D_W$ is still present in the buffer 104 for recording. During the write loop, the read data block $\#D_R$ and write data block $\#D_W$ in the buffer 104 may be continuously accessed, modified, released or erased depending on the commands issued from the host 102. Management of the read data block $\#D_R$ and write data block $\#D_W$ stored in the buffer 104 is an important issue concerning increased performance and efficiency.

BRIEF SUMMARY OF THE INVENTION

An exemplary embodiment of a buffer management method for an optical disc recorder is provided, the optical disc recorder coupled to a host issuing a read command requesting access for a read data block and a write command requesting recording of a write data block. In which, a write buffer is provided dedicated to store the write data block. A read buffer is provided dedicated to store the read data block. The method comprises entering the optical disc recorder into a write loop. During the write loop, the optical disc recorder triggering a write command handling procedure in response to the write command; triggering a read command handling procedure in response the read command; and triggering a pre-recording procedure to prepare the write data block in the write buffer for recording. Wherein contents between the write buffer and read buffer are exchangeable during the write handling procedure, the read handling procedure or the pre-recording procedure.

During the write loop, the write command handling procedure is triggered upon receipt of a write command, the read command handling procedure is triggered upon receipt of a read command, and a pre-recording procedure is triggered to prepare the contents in the write buffer, such that optical disc writing efficiency is increased.

In the read command handling procedure, the method comprises: checking whether the requested read data block associated with the read command is available in the write buffer; copying the read data block from the write buffer to the read buffer if the checked result is positive; and transferring the read data block to the host as a response to the read command.

In the write command handling procedure, the method comprises: storing the write data block to be recorded to the write buffer; and copying/storing the write data block to the read buffer. Alternatively, the method further comprises: checking contents in the read buffer to determine whether the write data block is an update of the content stored in the read buffer before copying is executed, if the checked result is positive.

In the pre-recording procedure, an ECC block is established in the write buffer as a basic unit for physical recording, the pre-recording procedure collects essential data blocks to increase integrity of an ECC block, in which absent data blocks are obtained from the read buffer. Specifically, the pre-recording procedure further checks the contents in the read buffer to determine whether a data block associated with the read command or write command contributes to the integrity of the ECC block in the write buffer, and the read buffer copies the data block to the write buffer to increase the integrity of the ECC block when the contribution is confirmed.

Another embodiment provides a buffer management method implemented in the described optical disc recorder, and a detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
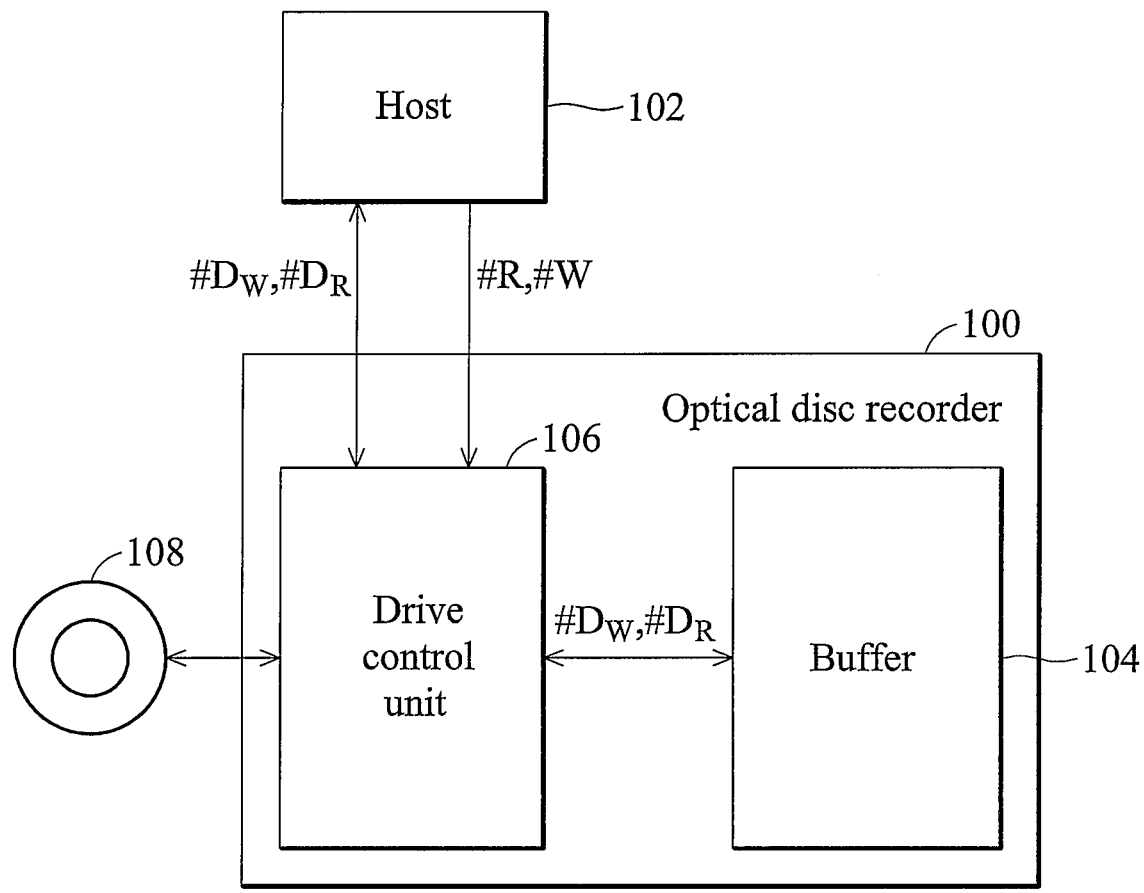
FIG. 1 shows a conventional structure of an optical disc recorder.
Figure 2A:
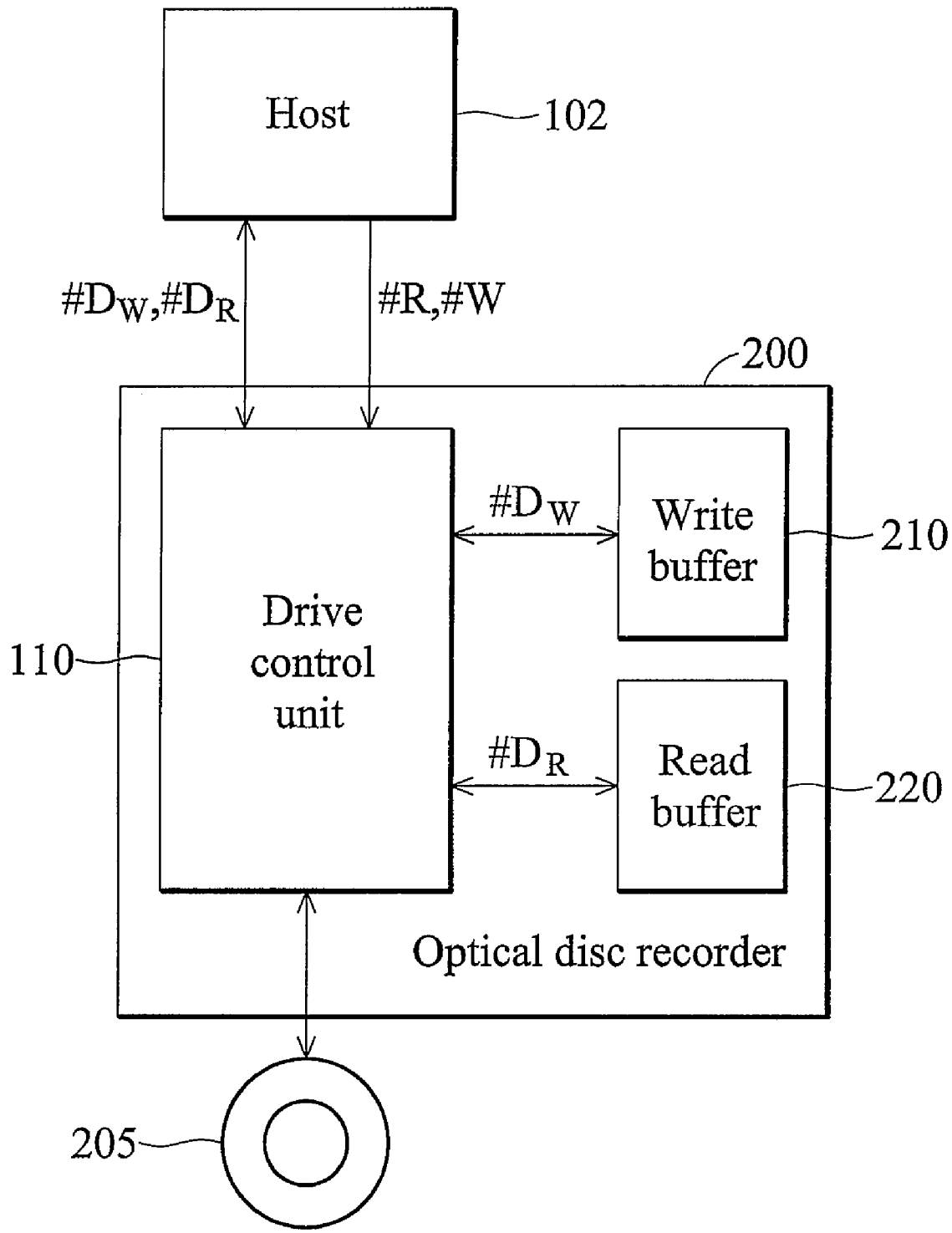
FIG. 2a shows an embodiment of an optical disc recorder coupled to a host.

FIG. 2a shows an embodiment of an optical disc recorder 200 coupled to a host 120. The host 120 may issue a read command #R to request optical disc recorder 200 accessing a read data block $\#D_R$ from the optical disc 205, or a write command #W to request optical disc recorder recording a write data block #$D_W$ to the optical disc 205. The optical disc recorder 200 includes at least a write buffer 210, a read buffer 220 and a drive control unit 110. According to the invention, data blocks stored in the write buffer 210 and read buffer 220 are able to be exchanged between the write buffer 210 and read buffer 220. The write buffer 210 is dedicated to store write data block #$D_W$ for recording operation. The read buffer 220 is dedicated to store read data block #$D_R$ for reading operation. In response to a write command #W and read command #R issued from the host 120, the drive control unit 110 coupled to the write buffer 210 and read buffer 220 is a processing unit performing physical recording and reading data on and from the optical disc 205. In addition, the drive control unit 110 further controls the write buffer 210 and the read buffer 220 to manage the data blocks stored in the buffer 201 and 220 for improving performance and efficiency. In the embodiment, a buffer management method is provided to manage the write buffer 210 and read buffer 220. The contents between the write buffer 210 and read buffer 220 are exchangeable according to relationships of the read command #R, the write command #W and the contents. In other words, the write buffer 210 and read buffer 220 are mutually interactive while each serves different functionality. The detailed embodiments are described below.

The data blocks received by drive control unit 110 may be directly stored into the write buffer 210. Alternatively, the received data blocks may be further be encoded before storing into the write buffer 210. In addition, the data blocks received by drive control unit 110 may be directly stored into the read buffer 210. Alternatively, the received data blocks may be further be decoded before storing into the read buffer 210. In other word, an encoding and modulation mechanism is required before the data blocks may need to be further encoded and are before recording onto the optical disc, and likewise, a decoding and demodulation mechanism is required before transfer back the data blocks are transferred to the host. This is well known for the person skilled in the art. The detailed descriptions are omitted for the sake of brevity.

Figure 2B:
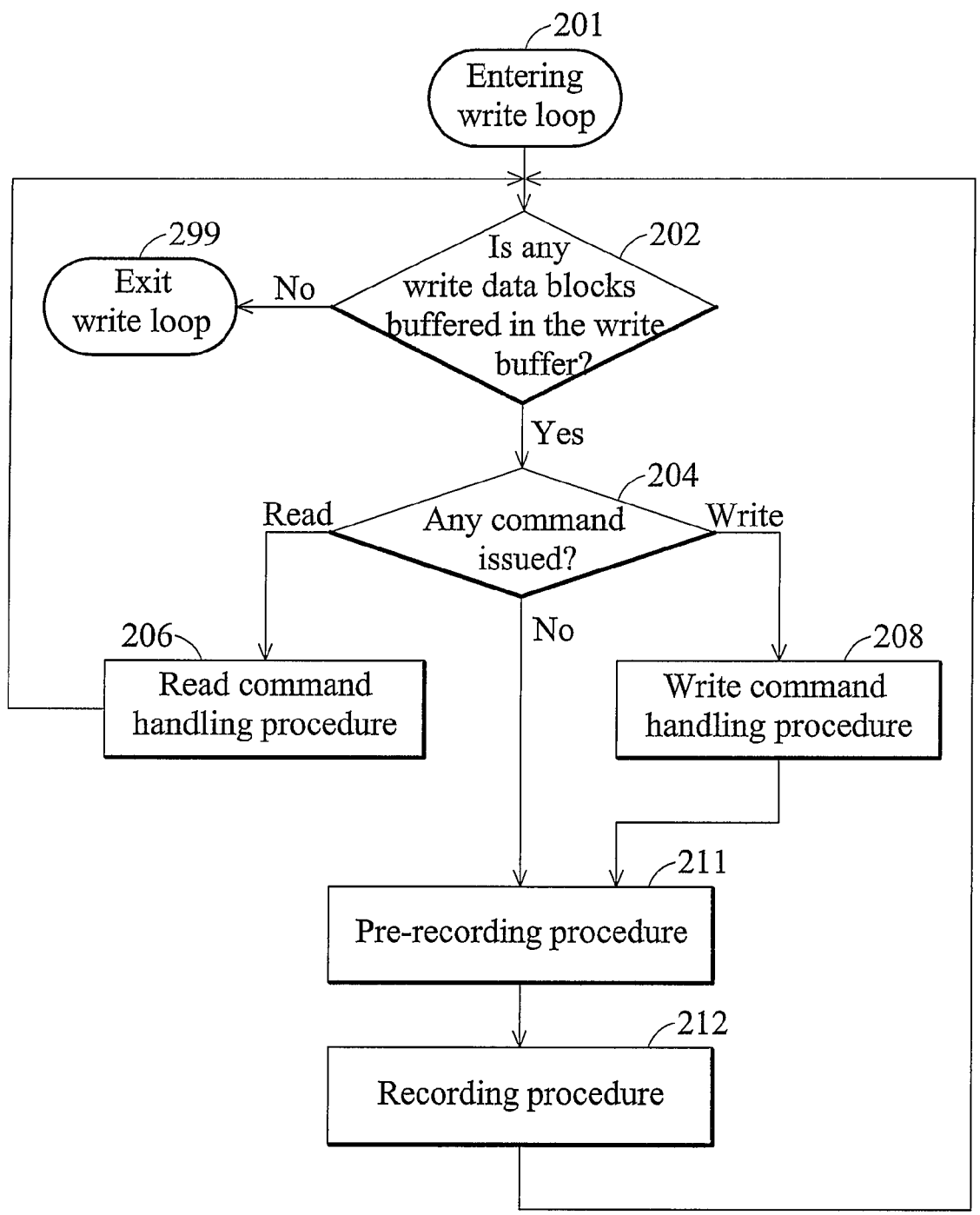
FIG. 2b is a flowchart of a buffer management method in a write loop.

FIG. 2b is a flowchart of a buffer management method in a write loop. The optical disc recorder enters a write loop as long as when any write data block #$D_W$ is stored in the write buffer 210 for recording. The write loop is initialized in step 201, and thereafter, in step 202, the drive control unit 110 checks the write buffer 210 to determine whether any write data block #$D_W$ is buffered for recording. If not, step 299 exits the write loop. Otherwise, the process goes to step 204, and the drive control unit 110 checks whether any command issued from host 120 has been received. If a read command #R is received, a read command handling procedure is triggered in step 206 to provide the requested read data block #$D_R$, and conveniently, the write buffer 210 and/or read buffer 220 are rearranged for better performance. Likewise, if a write command #W is received, the write data block #$D_W$ is transferred from the host 120 and stored into the write buffer 210 by a write command handling procedure in step 208, and the contents in the write buffer 210 and read buffer 220 are further regulated to increase the efficiency. If no command received, then goes to step 211, a pre-recording procedure is further executed, whereby at least an ECC block is prepared as basic unit for physical recording. After step 211, a recording procedure is performed in step 212. If a recording start condition is met, the drive control unit 110 records the prepared ECC block onto the optical disc 205. Detailed embodiments of the procedures are further described below.

In an alternative embodiment, when the recording start condition is met, the pre-recording procedure is initialized. And then, the recording procedure is performed to record the data blocks into the optical disc 205. Otherwise, the process goes to step 202.

Figure 3:
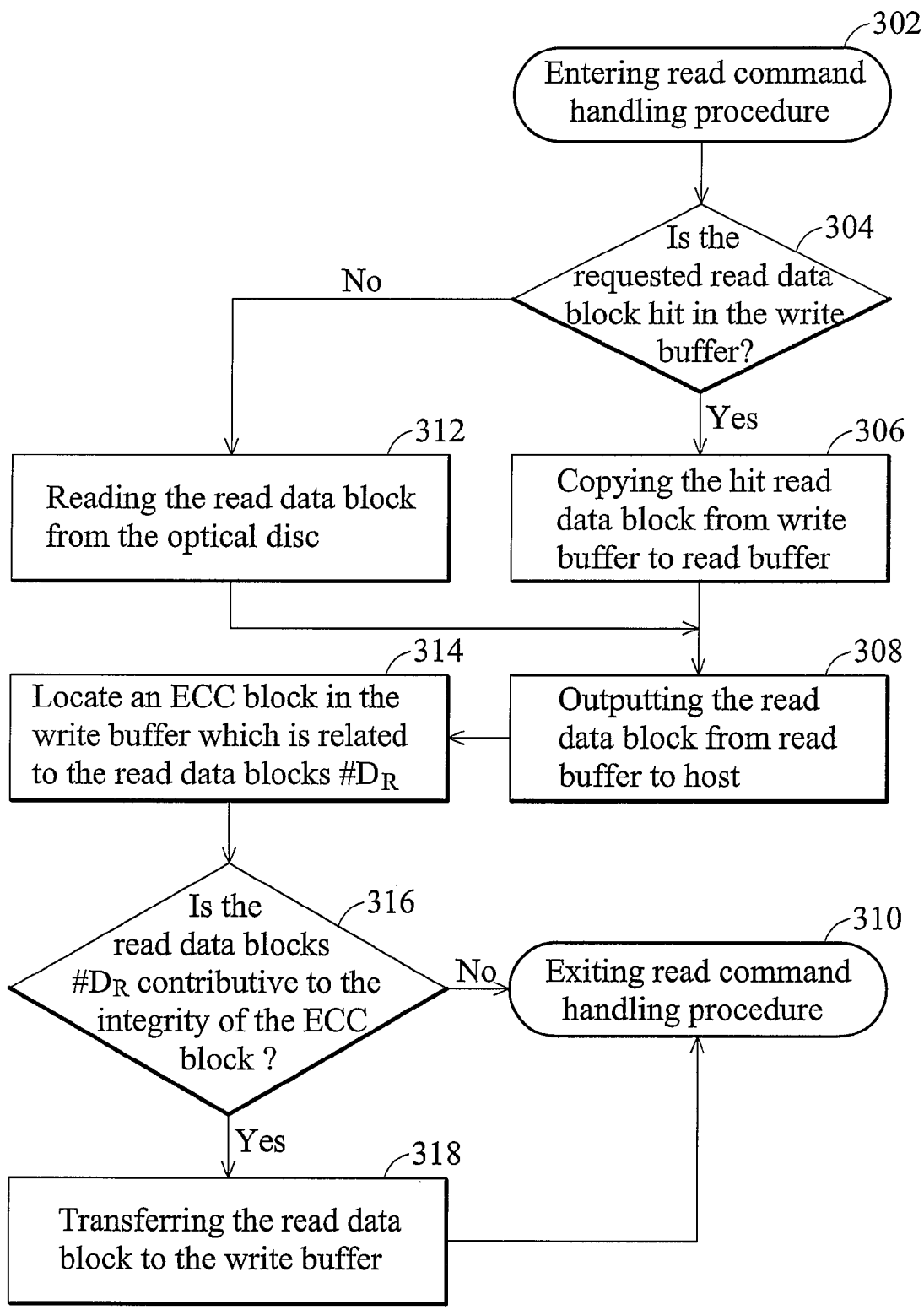
FIG. 3 is a flowchart of a read command handling procedure in the write loop.

FIG. 3 is a flowchart of a read command handling procedure in the write loop. In step 302, the read command handling procedure is initialized. In step 304, the drive control unit 110 checks whether the requested read data block #$D_R$ associated with the read command #R is available in the write buffer 210 but not in the read buffer 220. Normally the availability is referred to as a cache 'hit', whereas the unavailability is a cache 'miss'. If the read data block #$D_R$ is 'hit' in the write buffer 210, step 306 is executed, whereby the drive control unit 110 copies the read data block #$D_R$ from the write buffer 210 to the read buffer 220. Thereafter, in step 308, the read buffer 220 transfers the read data block #$D_R$ to the host 120 as a response to the read command #R. If the read data block #$D_R$ is 'missed' in both write buffer 210 and read buffer 220, step 312 may be executed to physical access the optical disc 205 for retrieving the read data block #$D_R$ from the optical disc 205. After step 312, step 308 is executed. In step 314, the drive control unit 110 searches the write buffer 210 to determine whether an ECC block related to the retrieved read data block #$D_R$ is existed. Thereafter, in step 316, it is determined whether the found retrieved data blocks are contributive to the integrity of the ECC block. If so, step 318 is processed, wherein the drive control unit 110 transfers the found retrieved data blocks to the write buffer 210 to increase the integrity of the ECC block. Otherwise, the read command handling procedure is concluded in step 310. Other exceptions may occur in step 304, and the embodiment does not limit other functionalities to be implemented in the read command handling procedure. When a response to the read command #R is output, the read command handling procedure is concluded in step 310.

Figure 4:
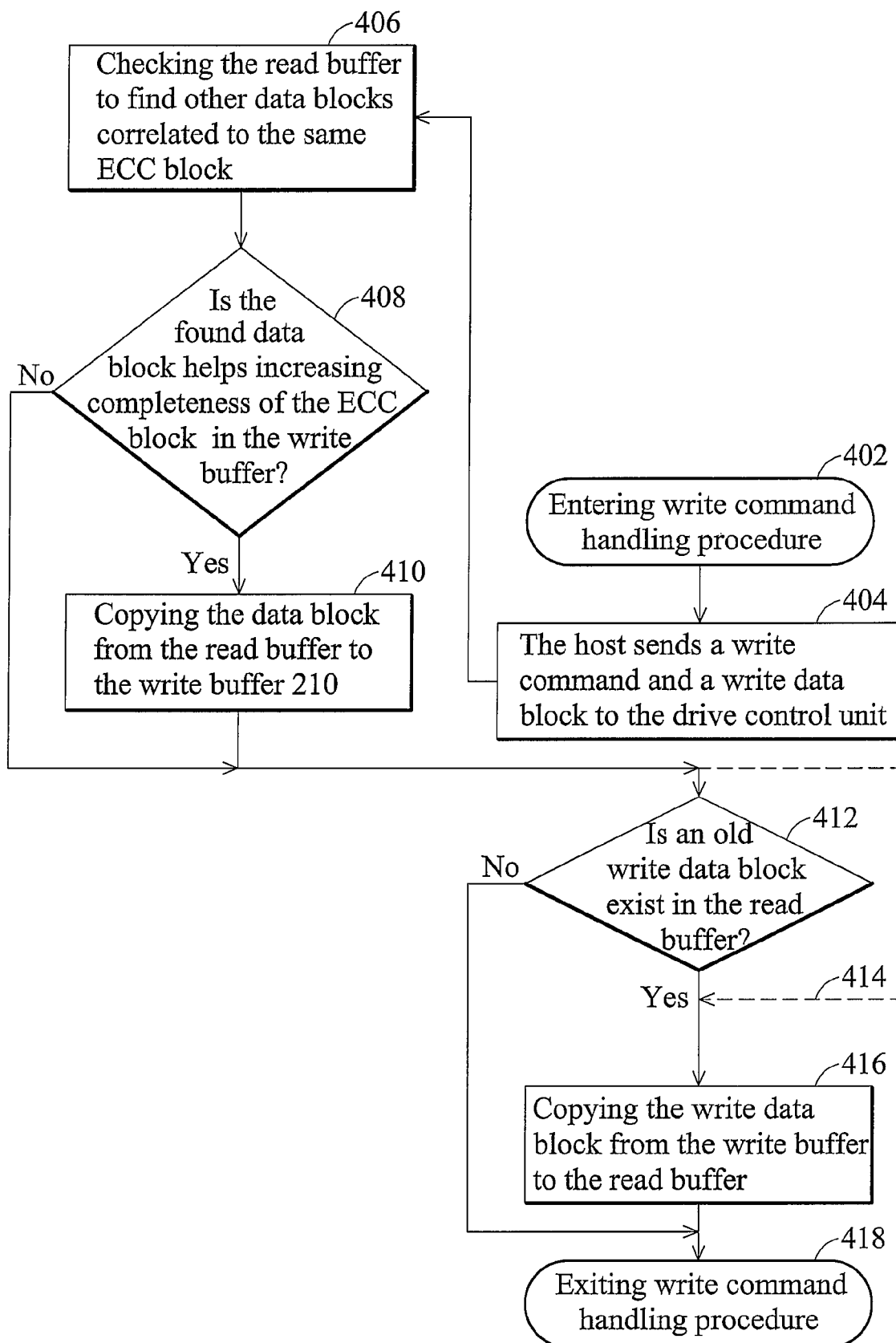
FIG. 4 is a flowchart of a write command handling procedure in the write loop.

FIG. 4 is a flowchart of a write command handling procedure in the write loop. The write command handling procedure is initialized in step 402. In step 404, the drive control unit 110 receives a write command #W and a write data block #$D_W$ from the host 120, requesting to record the write data block #$D_W$ into the optical disc 205. The drive control unit 110 stores the received write data block #$D_W$ into the write buffer 210. In step 406, the read buffer 220 is checked to find out whether other data blocks stored in the read buffer 220 associated with the received write data block #$D_W$ are correspondent to the same ECC block. In step 408, it is determined whether the found data block is determined whether or not they are contributive to the integrity of the ECC block. If so, step 410 is processed, whereby the drive control unit 110 copies the found data blocks from the read buffer 220 to the write buffer 210 to increase the integrity of the ECC block. After step 410, the process may unconditionally jump to step 416 via a dot line 414, whereby the drive control unit 110 copies the write data block #$D_W$ from the write buffer 210 to the read buffer 220 upon reception of the write data block #$D_W$. Alternatively, the step 416 may be implemented in conjunction with Step 412. In step 416, when the drive control unit 110 receives the write data block #$D_W$ from the host 120, the drive control unit 110 stores the received write data block #$D_W$ into both of the write buffer 210 and the read buffer 220.

In other case, step 412 is executed after step 410, in which contents of read buffer 220 are checked to determine whether the received write data block #$D_W$ is an update of the content stored in the read buffer 220. Else, the contents of read buffer 220 may also be checked to determine whether the received write data block #$D_W$ are associated to the same ECC block. A cache 'hit' may be detected for the received write data block #$D_W$, however, the latest received write data block #$D_W$ would have to overwrite any previous old copies in the write buffer 210 or read buffer 220. Thus, through step 412, step 416 will be executed when an old copy of the write data block #$D_W$ is previously presented in the read buffer 220, or when the received write data block #$D_W$ has association with the contents stored in the read buffer 220. In step 416, the write data block #$D_W$ is copied to the read buffer 220. Lastly, the write command handling procedure is concluded in step 418. In other words, the embodiment demonstrates that the write data block #$D_W$ can be directly (via dot line 414) or indirectly (via step 412) transferred to the read buffer 220.

Figure 5:
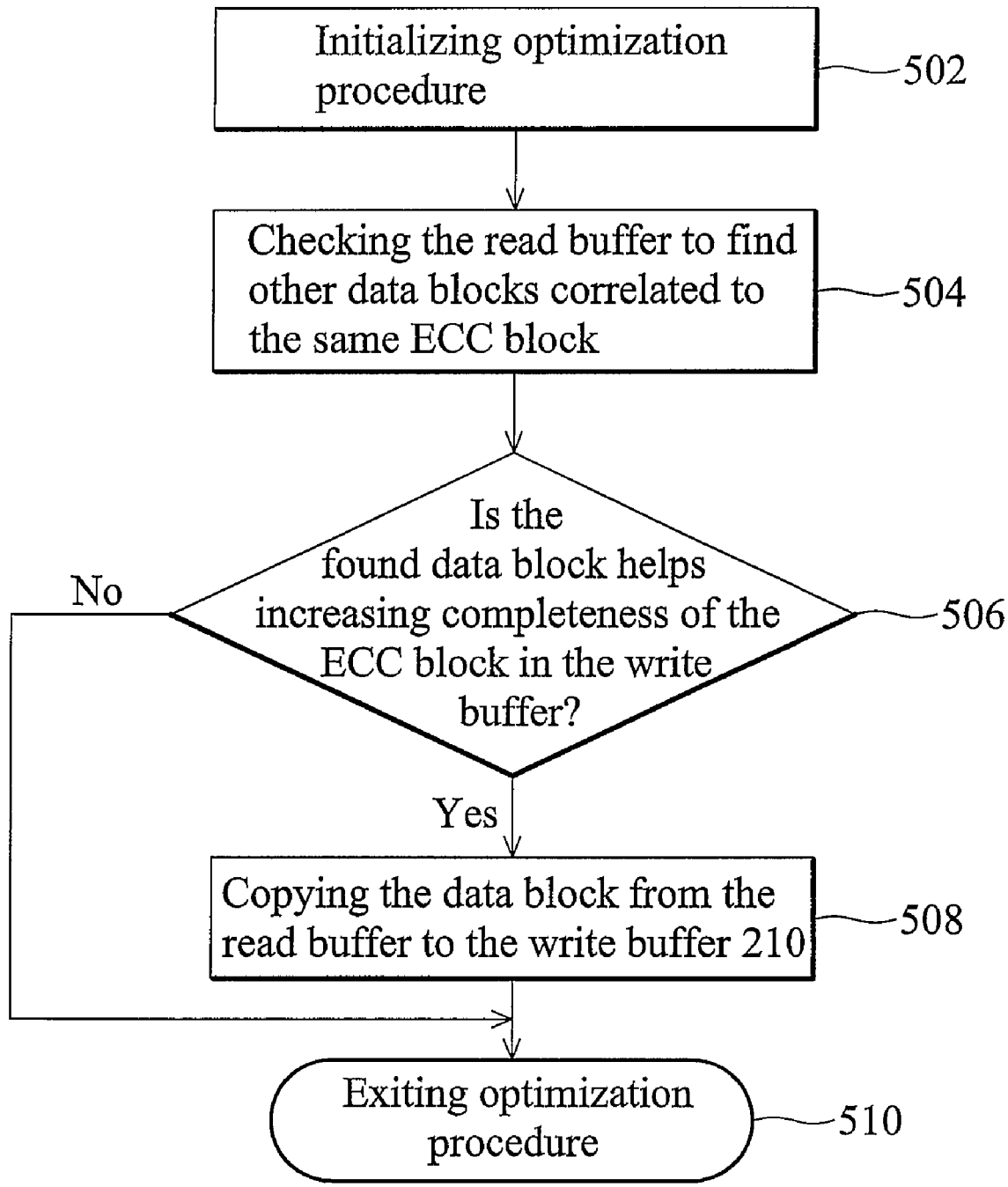
FIG. 5 is a flowchart of a pre-recording procedure in the write loop.

FIG. 5 is a flowchart of a pre-recording procedure in the write loop. As known for data preparation procedure, an ECC block including a plurality of data blocks is a basic unit for physical recording. When physical recording is required, the optical disc recorder 200 may perform a read-modify-write operation to assemble a complete ECC block in the write buffer 210. In a typical read-modify-write operation, if essential data blocks corresponding to the ECC block are unavailable in the write buffer 210, they are automatically retrieved from the optical disc 205 and stored in the write buffer 210. Therefore a read-modify-write operation is typically an aggressive data collection process. The pre-recording procedure tends to prepare a more complete ECC block passively, thus essential data blocks corresponding to the ECC block are gathered as much as possible while in the write loop. Step 502 initializes the pre-recording procedure. In step 504, the read buffer 220 is checked to find out whether other data blocks associated with the same ECC block exist. In step 506, the found data blocks are determined whether or not they contribute to the integrity of the ECC block. If they do (Yes, step 508), the drive control unit 110 copies the found data blocks from the read buffer 220 to the write buffer 210 to increase the integrity of the ECC block. Otherwise, the pre-recording procedure is concluded in step 510.

In another exemplary embodiment, during the read-modify-write operation, data blocks corresponding to the ECC block may be retrieved from the optical disc 205 and stored in the write buffer 210. The retrieved data blocks may be copied to the read buffer 220 for improving the read operation efficiency.

The embodiments are particularly adaptable for a DVD-RAM or Blu-Ray recorder. The write buffer 210 and read buffer 220 may be implemented in one memory array, or two individual memory devices. The embodiments of a buffer management method in the disclosure significantly improves the efficiency and performance for disc recording devices, especially for read-modify-write operations and random recording operation where writing and reading may simultaneously performed in a write loop.

While the invention has been described by way of example and in terms of preferred embodiment, it is to be understood that the invention is not limited thereto. To the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. A buffer management method for an optical disc recorder coupled to a host, wherein the host issues a read command for requesting a read data block and a write command for recording a write data block, comprising:
storing the write data block in a write buffer, and storing the read data block in a read buffer; and
triggering a write command handling procedure in response to the write command, wherein the write command handling procedure comprises: determining whether an other data block in the read buffer associated with the write data block in the write buffer contributes to the integrity of an ECC block; and copying the other data block to the write buffer to increase the integrity of the ECC block when the contribution is confirmed, wherein the content of the other data block is not equal to the content of the write data block;
triggering a read command handling procedure in response to the read command; and
triggering a pre-recording procedure to obtain the write data block in the write buffer;
wherein contents between the write buffer and read buffer are exchangeable during the write command handling procedure, the read command handling procedure or the pre-recording procedure, wherein the ECC block is a basic recording unit of an optical disc.

2. The buffer management method as claimed in claim 1, wherein the read command handling procedure comprises:
checking whether the requested read data block associated with the read command is available in the write buffer;
copying the read data block from the write buffer to the read buffer if the checked result is positive; and
transferring the read data block from the read buffer to the host as a response to the read command.

3. The buffer management method as claimed in claim 2, wherein the read command handling procedure further comprises:
accessing the read data block from an optical disc if the checked result is negative;
determining whether the read data block accessed from the optical disc contributes to the integrity of an ECC block in the write buffer; and
transferring the read data block accessed from the optical disc to the write buffer if the determination result is positive.

4. The buffer management method as claimed in claim 1, wherein the write command handling procedure comprises:
storing the write data block to be recorded in the optical disc to the write buffer; and
copying the write data block to the read buffer.

5. The buffer management method as claimed in claim 1, wherein the write command handling procedure comprises:
storing the write data block to be recorded in an optical disc to the write buffer;
checking the contents in the read buffer to determine whether the write data block is an update of the content stored in the read buffer; and
copying of the write data block from the write buffer to the read buffer if the checked result is positive.

6. The buffer management method as claimed in claim 1, wherein the write command handling procedure comprises:
storing the write data block to be recorded in an optical disc to the write buffer; and
storing the write data block to the read buffer.

7. The buffer management method as claimed in claim 1, wherein:
the pre-recording procedure comprises collecting essential data blocks to increase integrity of the ECC block in the write buffer, in which absent data blocks are obtained from the read buffer.

8. The buffer management method as claimed in claim 7, wherein the pre-recording procedure further comprises:
checking the contents in the read buffer to determine whether a data block associated with the read command or write command contributes to the integrity of the ECC block in the write buffer; and copying the data block from the read buffer to the write buffer to increase the integrity of the ECC block when the contribution is confirmed.

9. A buffer management method for a storage medium, comprising:

storing a read data block in a read buffer;

storing a write data block in a write buffer;

determining whether the r d data block an other data block in the read buffer associated with the write data block contributes to the integrity of an ECC block, wherein the content of the other data block is not equal to the content of the write data block; and copying the other data block to the write buffer to increase the integrity of the ECC block when the contribution is confirmed, wherein the ECC block is a basic storing unit of the storage medium.

10. The buffer management method as claimed in claim 9, wherein the write data block is received from a host in response to a write command.

11. The buffer management method as claimed in claim 9, wherein the read data block is received from the storage medium in response to the read command.

* * * * *